United States Patent [19]
Ruff

[11] 3,904,539
[45] Sept. 9, 1975

[54] INSULATION HAVING A REDUCED THERMAL CONDUCTIVITY

[75] Inventor: David L. Ruff, Harbor City, Calif.

[73] Assignee: Grefco, Inc., Bala Cynwyd, Pa.

[22] Filed: Jan. 2, 1973

[21] Appl. No.: 320,504

[52] U.S. Cl............................ 252/62; 161/159
[51] Int. Cl.² ................................. C04B 43/12
[58] Field of Search.................. 252/62; 161/159

[56] References Cited
UNITED STATES PATENTS

| | | | |
|---|---|---|---|
| 2,077,094 | 4/1937 | Byers | 252/62 X |
| 3,015,626 | 1/1962 | Kingsbury | 252/62 |
| 3,408,316 | 10/1968 | Mueller et al. | 252/62 X |
| 3,623,938 | 11/1971 | Jenkins | 161/159 |
| 3,625,896 | 12/1971 | Kirk et al. | 252/62 |
| 3,655,564 | 4/1972 | Barrington | 252/62 |
| 3,701,672 | 10/1972 | Ruff et al. | 252/62 X |
| 3,725,095 | 4/1973 | Weidman et al. | 252/62 X |

Primary Examiner—Benjamin R. Padgett
Assistant Examiner—E. A. Miller
Attorney, Agent, or Firm—Fidelman, Wolffe & Leitner

[57] ABSTRACT

The thermal conductivity i.e. K factors of insulating compositions can be lowered significantly by using a relatively low loose weight density expanded perlite which has been milled.

11 Claims, No Drawings

INSULATION HAVING A REDUCED THERMAL CONDUCTIVITY

This invention relates generally to thermal insulating compositions, especially those compositions useful in insulation board.

More specifically, the invention relates to a method and composition for use in insulating compositions having a reduced coefficient of thermal conductivity.

Insulating products have been known for many years, especially those incorporating various inert types of mineral aggregates, fibrous materials and accorded binders or combination binding-sizing agents. An example of inert types of mineral aggregates includes expanded perlite and exfoliated vermiculite. Perlite is a form of glassy rock similar to obsidian, usually containing, inter alia, 65–75% silicon dioxide, 10–20% aluminum trioxide, and 2–5% water. When perlite is heated to the softening point, it expands to form a light, fluffy material similar to pumice. Vermiculite is a mineral of the mica group; however, it is hydrated and has the property of expanding 6–20 times its volume when heated to about 2,000°F. Basically, it is a hydrated magnesium-aluminum-iron silicate which contains small quantities of other minerals. Perlite is a generic term for the above-noted glasses of the volcanic type, which upon being heated to controlled temperatures expand to form particles possessing good thermal insulating qualities. Further, it has been known that expanded perlite possesses special qualities when used in conjunction with fibrous material and select binders to manufacture lightweight insulating boards of various types. Certain of these products have been found to be extremely useful as roofboard insulators and have included a large proportion of the expanded perlite mineral aggregate, a relatively low proportion of fibrous-binder material, i.e. an amount proportional to the strength desired from this ingredient and sufficient binder-size to waterproof and hold the aggregate and the fibers firmly together in a dimensionally stable composition.

Such products have generally been formed using the "wet" process which involves preparation of a water slurry of the board ingredients, defibration of the fibrous material, uniform suspension of the solids throughout the slurry through agitation, and dewatering the slurry by passing it over e.g. a drainage screen or the like to produce a felted wet board, light compression of the wet board to consolidate and impart uniform thickness thereto, followed by drying of the formed board. The instant invention modifies the above-described process by including in the water slurry of board ingredients a substantial amount of perlite which has been milled to smaller particles, thereby increasing its loose weight density given in units of pounds per cubic foot. Ultimately, the board is dewatered and dried as in the above process. The board forming slurries containing the mineral aggregate discussed above have very favorable dewatering properties which render the slurries advantageously free-filtering in nature.

The end result is a multi-component insulating board containing a mineral aggregate, fibers and a binder-sizing agent wherein an inter-entangled mass of loose fibers entrap and hold the particles of the mineral aggregate in a spaced relationship throughout the insulation board.

Conventional insulation board suffers from deficiencies relating to insulating efficiency and it would indeed be advantageous to provide a composition for similar applications having an improvement in thermal conductivity.

OBJECTS OF THE INVENTION

It is a primary object of the present invention to improve upon the prior art insulating compositions by providing a composition which has all of their advantages, including light weight, ease of formation in the wet process, and additionally possessing substantially improved insulating qualities as evidenced by a reduced coefficient of thermal conductivity and a method for providing such reduction in thermal conductivity.

It is a further object of this invention to provide a general purpose insulating board having especially good heat insulating qualities, while combining optimally low weight per unit volume with high thermal efficiency to resist heat transference.

Additionally, it is an object to produce an insulating board which is easily formed in the "wet process" and which will efficiently and successfully insulate against heat.

SUMMARY OF THE INVENTION

A thermal insulating composition and a process for its production are provided wherein the composition comprises a mineral aggregate of perlite, a fibrillated organic fibrous material as the primary binder and, optionally, a binder-sizing agent wherein the insulating composition is in the form of insulation and the mineral aggregate has been milled either totally or in part to improve the thermal efficiency by reducing the coefficient of thermal conductivity, K, given in units of Btu. in. per square foot, hr. °F.

Additionally, the process for producing the thermal insulating material is provided which involves single or multiple milling of the thermally expanded mineral aggregate prior to or while adequately mixing said aggregate, the organic fibrous binder material and a binder-size prior to depositing a sufficient amount of said composition on a board-forming machine to form a mat of desired thickness and consistency. The mat is then partially dewatered, pressed and dried to produce the thermal insulating material.

More specifically, the invention comprises a thermal insulating composition which is produced from a thermally expanded mineral aggregate such as perlite which has been milled, crushed or reduced in particle size, a cellulosic fibrous binder material, such as cellulosic pulp, and a binder-sizing agent which is generally bituminous in nature, incorporated into a slurry which is deposited on a board-forming machine in the wet state and partially dewatered. Subsequent to the partial dewatering, the board may be processed to improve its strength properties, for example, by coating the still wet deposited mass, wherein said coating may contain various additives which improve surface strength, fire retardant properties, etc. These additives may include among others boric acid, borax, ammonium sulfate and various phosphates which all contribute generally to improved fire retardance.

The coefficient of thermal conductivity, the K-factor, is in units of Btu. in./ft.$^2$ hr. °F. determined at a nominal mean temperature of 75°F. and is a measure of the ability of the insulating composition to retard the transference of heat, thereby providing good thermal insulation. The K factor, therefore, is generally a measure of thermal insulation efficiency in the respective insulating compositions. Its importance as an indicator of the insulating quality of insulating materials is well known in the industry. Insulating boards having a K factor below about 0.38 are recognized in the industry as being of special importance for various uses in which such boards find primary utility. A reduction of as little as 0.01 or 0.02 units in a K factor of approximately 0.38 are often considered to be of substantial value as far as the utility of the end product is concerned. The examples found infra indicate the efficacy of the instant invention in sufficiently reducing the coefficient of thermal conductivity in insulating compositions as outlined above. Major factors contributing to the value of the thermal conductivity of the resultant composition include: concentration of fiber in the board, since pore size of the resultant product is reduced due to closer packing of fibers and perlite; board density, since the thermal conductivity is generally a linear function of board density over a broad range; and the loose weight density of the thermally expanded perlite utilized in the composition. Additionally, it has been found (in accord with the instant invention) that milling the perlite prior to or during its incorporation into the board forming-composition contributes remarkable assistance to reducing the coefficient of thermal conductivity of the resultant insulating board. The milled perlite may be used to completely replace the unmilled perlite or may be used to replace a small portion or substantially all of the unmilled perlite used in prior compositions.

The most consistently low K factors were obtained by controlling the milling of the expanded perlite used in the board forming composition. Using such a controlled milling procedure enabled attainment of K vs. density curves which showed essentially no increase in K with increase in board density. By selecting a relatively low initial loose weight density expanded perlite, the entire K vs. board density curve was flattened out over from about 7.5 to about 12.4 pounds per cubic foot density range board at about the 0.335 K level. These results are opposite to those which would be predicted from examination of available literature on expanded perlite density vs. K factor curves since milling generally increases the density of the thermally expanded perlite and thermal conductivity of loose fill perlite increases with perlite loose weight density. Therefore, the controlled milling process can be effectively used to hold the board K factors to a constant level even though density increases in resultant compositions may be desired. Milling generally makes it easier to obtain higher board densities by eliminating the need for high pressures during board processing. Milled perlite boards formed through the instant invention were found to be easily dewatered, and filtrate water of milled perlite boards was somewhat cleaner than normal.

Not only have the specific ingredients of our insulating composition been selected and combined with care, but so have the proportions of the ingredients been chosen to give optimum results.

Our invention also comprises the use of the following ranges (Table 1) of proportions of total weight of final dry insulating compositions:

TABLE 1

| Ingredients | Percent of Board Substrate |
| --- | --- |
| Thermally expanded perlite | 40–90% |
| Defibrated organic fibrous material | 10–60% |
| Bituminous binder-sizing material | 0–15% |

Various other additives may be included in the above noted composition to yield desired qualities commensuarte with the qualities and degree to which they are improved.

Some additives may further improve particular aspects of the resultant board composition such as transverse strength characteristics and surface strength characteristics without appreciably detracting from other important characteristics necessary for an advantageously utilizable material.

The thermally expanded mineral perlite used in these compositions should comprise from about 40 to about 90% by weight of the total board composition. The expanded particles facilitate dewatering of the wet board slurry and contribute voids to the interior of the final board, thereby resisting transfer of heat by convection and conduction. The perlite also contributes to the compressive strength of the board as well as to its indentation resistance. The milled, expanded mineral perlite used in conjunction with this invention should be in particle form having a loose weight density of from about less than two pounds per cubic foot to about ten pounds per cubic foot. Mesh sizes of the expanded ummilled mineral aggregate typically range from about 325 mesh to about 4 mesh for optimum performance; however, other sizes may also be utilized as well providing that the density of such particles falls within the range necessary to provide a low coefficient of thermal conductivity upon milling of a portion of, substantially all, or all of the thermally expanded mineral aggregate used in the insulating composition of the instant invention.

The milling or crushing of the thermally expanded perlite used in the instant invention can be accomplished by various dry processing means, including a hammer mill of the micro-pulverizer type with changeable screens, milling blowers or by wet milling of liquid dispersions of perlite by common propeller, impeller, Cowles-type or turbine-type milling devices, or by any suitable crushing or rolling process wherein the particle size of the thermally expanded perlite is reduced. The milling process may be accomplished in a single step or in multiple steps depending on the effect attained in decreasing the coefficient of thermal conductivity. The milled perlite of the invention essentially ranges in size from about 6 microns to about 295 microns with a major proportion being in the 38 to 147 micron range.

The degree of milling and/or proportion of finely milled perlite used in a specific board composition depends in part on the desired physical properties such as density, the increase of which is facilitated by increased milling to smaller particle sizes.

The fibers used in the instant invention are usually obtained from wood; however, other cellulosic fibers are used depending upon the supply. For example, waste paper fibers, corn stalks, sugar cane or the like may be utilized. In addition, non-cellulosic fibers may be utilized either exclusively or in combination with cellulosic fibers. For purposes of simplicity, the description will be confined to cellulosic fibers and it will be understood that the other fibers may be used instead while remaining within the scope of this invention. Fibrous substances used within the purview of the instant invention are all used in their defibrated or individualized states. They include various organic fibers such as newsprint pulp, kraft paper pulp, bagasse, and others. Of course, these fibers are not limited to organic or cellulosic fibers. Other fibrous materials may be used dispersed in the slurry which are not organic in nature, such as asbestos fibers. They too may improve strength characteristics of the board in addition to fire retardancy characteristics. The fibrous material is dispersed in the board making slurry such that the individual fibers are separated from one another, thus assuring their presence in the final board composition as a mass of interentangled fibers which surround the aggregate particles as well as the other components of the board slurry. Long or short fibers may be used or a mixture of fibers of different lengths may be employed successfully. However, for optimum results, the fibers in the board should be from about .07 to 5 mm. long and from about .01 to .03 mm. in diameter.

Various examples of materials which can be utilized principally as binders (however, which may contribute other favorable characteristics to the substrate composition useful in practicing the instant invention) used either alone or in combination are clays, such as kaolin or china clay, ball clay, fire clay, stoneware clay, bentonite, fuller's earth, activated clays, dusting clays, bleaching clays, calcined clays, colloidal clays, enamel clays and filler clays. Starch may be used as a binder and various bituminous additives such as asphalt may be added either as a solid or in the form of an emulsion for waterproofing and binding. Other materials having similar properties and accomplishing similar effects may be utilized in the practice of the instant invention. Particularly advantageous in the practice of this invention is asphalt as a binder-sizing agent either alone or in combination with bentonite clay and starch.

The amount of binder-sizing agent used in the insulation board is advantageously from less than about one to about 15 percent based on the dry weight of the final composition. If bentonite clay is used, it enhances the fire resistance of the board since it is incombustible. Asphalt is inexpensive, easy to use, and functions sufficiently well as a binding material, in addition to its added quality of providing water repellency of the final insulating board. It is certainly within the purview of this invention to use various combinations of these materials to give an advantageously improved product. An example of this is the combination of bentonite clay and starch which improves the fire resistance of the board while assuring high binding strength.

The primary advantage of the instant invention is the notable reduction of the coefficient of thermal conductivity in the insulating composition board discussed above. This reduction in the K factor is accomplished primarily by incorporating into the board forming slurry a thermally expanded mineral aggregate of perlite which has been either combined with a portion of crushed or milled perlite or completely crushed or milled prior to or during its incorporation in the board slurry.

The process for producing the insulating boards of the instant invention involves adequately mixing the thermally expanded mineral perlite, a defibrated, preferably cellulosic fibrous material, and optionally a binder-sizer in an aqueous slurry; depositing a sufficient amount of said composition on a board forming machine to form a mat of the desired thickness and consistency, dewatering said mat followed by pressing and drying said mat to form the insulation board. If desired, the partially dewatered mat may be coated with a reinforcing composition which enhances the strength properties of the ultimate board without detracting appreciably from the reduction in the coefficient of thermal conductivity provided for herein.

Several embodiments of the invention have been described in some detail below in order to enable those skilled in the field to apprehend fully the principles and to produce such units using only the ordinary skills of their specialty. No inference, however, should be drawn from the detailed character of the description that the invention is limited in its employment to any such details of the composition or procedure. On the contrary, a wide variety of embodiments is possible as will readily occur to those skilled in this field and the invention is to cover all alternatives, substitutions and equivalents only within the spirit and scope of the invention as expressed in the appended claims. The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLES

The following examples illustrate the preparation of the thermal insulating composition discussed in the foregoing. Each of the six examples listed in Tables 2 and 3 below were conducted following the same basic procedure as will be outlined infra. The variations in milled perlite density and coefficient of thermal conductivity are indicated in these tables. In a typical process for preparing the insulating composition of the instant invention, pulped newsprint in such a proportion as to constitute 23% by weight of the final dry board is added to water to make a diluted paper pulp slurry. An appropriate amount of binder-size, in this instance 5% by weight of an asphalt emulsion, is added to the aqueous pulp slurry. The thermally expanded mineral perlite is milled or crushed and is added to the pulped newsprint in an amount such that it constitutes 72% of the final dry weight of the board. The pulped newsprint-asphalt-perlite is then mixed in accordance with standard procedure for the preparation of insulation board. The composition is then placed on the board former and dewatered by suction, followed by pressing to a standard thickness and drying overnight at a temperature of 230°F. The resulting board in these examples was approximately one inch in thickness.

TABLE 2

| | Perlite Milling Conditions | | Perlite Properties | |
|---|---|---|---|---|
| Example No. | Screen Hole Dia. (in.)[1] | No. of Passes | Orig. Perlite Loose Weight Density(pcf)[2] | Final Milled Perlite Density(pcf) |
| 1 | .094 | 1 | 1.46 | 2.35 |
| 2 | .047 | 1 | 1.46 | 2.38 |
| 3 | .039 | 2 | 1.46 | 2.92 |
| 4 | .094 | 1 | 2.53 | 3.62 |
| 5 | .047 | 1 | 2.53 | 3.75 |

TABLE 2-Continued

| Perlite Milling Conditions | | | Perlite Properties | |
|---|---|---|---|---|
| Example No. | Screen Hole Dia. (in.)[1] | No. of Passes | Orig. Perlite Loose Weight Density(pcf)[2] | Final Milled Perlite Density(pcf) |
| 6 | .039 | 2 | 2.53 | 4.64 |

[1]Refers to Micro Pulverizer Mill Screens
[2]pcf is pounds per cubic foot

TABLE 3

PROPERTIES OF BOARDS PREPARED WITH 100% MILLED PERLITE
EXAMPLES SHOWN IN TABLE 2

| Example Number | Board Density (pcf) | K factor of Typical Board w/Unmilled Perlite | K factor of Milled Perlite Bd. | Percent K factor - Reduction |
|---|---|---|---|---|
| 1 | 7.7 | .357 | .335 | 6.6 |
| 2 | 8.8 | .370 | .336 | 9.2 |
| 3 | 9.4 | .378 | .336 | 11.1 |
| 4 | 9.6 | .380 | .342 | 10.0 |
| 5 | 11.8 | .407 | .335 | 17.7 |
| 6 | 12.4 | .414 | .333 | 19.6 |

As evidenced by Table 3 above, there is a pronounced reduction in the coefficient of thermal conductivity following the procedure of the instant invention whereby the thermally expanded mineral aggregate, namely perlite, is milled or crushed prior to incorporation into the board composition.

Aside from the essential ingredients of the insulating materials of the present invention, other useful ingredients of the finished boards can also be included. For example, termite repellents, materials which prevent the formation of growth of algae, additional sizing materials in cases where the binder component of the boards does not impart sufficient resistance to water absorption may be added as determined by a particular usage of the board.

K factors were obtained using an electronic heat flow meter of the thermal transducer type specified in ASTM No. C 518. All data were taken at a 75°F. nominal mean.

Various available board forming machines may be employed for forming the boards described here on a commercial scale, including the Fourdriner machine, rotary vacuum filters, or cylinder-type board machines.

The principles, preferred embodiments, and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit or scope of the present invention.

What is claimed:

1. A thermal insulation board having a reduced coefficient of thermal conductivity in the range of about 0.333 to about 0.342 in the absence of mineral fibers consisting essentially of:
    a thermally expanded mineral aggregate wherein at least a portion of said thermally expanded mineral aggregate has been milled at least once to reduce particle size;
    a defibrated organic fibrous material;
    and an optional sizing agent or combination binder-sizing agent.

2. The thermal insulation board of claim 1 wherein the thermally expanded mineral aggregate is perlite.

3. The thermal insulation board of claim 1 wherein the binder-size is bituminous.

4. The thermal insulation board of claim 1 wherein the defibrated organic fibrous material is cellulosic.

5. The thermal insulation board of claim 1 wherein the density of the milled thermally expanded mineral aggregate ranges from about 2.35 to about 4.64 pounds per cubic foot.

6. A thermal insulation board having a reduced coefficient of thermal conductivity in the range of about 0.333 to about 0.342 in the absence of mineral fibers consisting essentially of:
    from about 40 to about 90% expanded mineral aggregate wherein at least a portion of said thermally expanded mineral aggregate has been milled to reduce particle size;
    from about 10 to about 60% defibrated cellulosic fibrous materials; and
    from less than 1 to about 15% bituminous binder-size.

7. The thermal insulation board of claim 6 wherein the defibrated cellulosic fibrous material is selected from the group consisting of pulped newsprint, kraft paper pulp, and bagasse and wherein the bituminous binder-size is asphalt.

8. The thermal insulation board of claim 7 wherein the defibrated cellulosic fibrous material is pulped newsprint.

9. The thermal insulation board of claim 6 wherein a portion of said thermally expanded mineral aggregate has been milled at least once to reduce the particle size to fall within a range of from about 6 microns to about 295 microns.

10. The thermal insulation board of claim 9 wherein a major portion of the particle size of the milled perlite falls within a range of from about 38 microns to about 147 microns.

11. A thermal insulation board having a reduced coefficient of thermal conductivity in the range of about 0.333 to about 0.342 in the absence of mineral fibers consisting essentially of, on a dry basis,
    from about 65 to about 85% thermally expanded perlite having an initial loose weight density of from about 1.0 to about 5.0 pounds per cubic foot and wherein at least a portion of said thermally expanded perlite has been milled to reduce particle size;
    from about 15 to about 35% pulped newsprint; and
    from about 4 to 6% asphalt.

* * * * *